(12) United States Patent
Shieh (10) Patent No.: US 9,551,367 B1
(45) Date of Patent: Jan. 24, 2017

(54) STRUCTURE OF BACK CLIP OF TOOL BOX

(71) Applicant: Wang-Ta Shieh, Kaohsiung (TW)

(72) Inventor: Wang-Ta Shieh, Kaohsiung (TW)

(*) Notice: Subject to any disclaimer, the term of this patent is extended or adjusted under 35 U.S.C. 154(b) by 0 days.

(21) Appl. No.: 14/884,757

(22) Filed: Oct. 15, 2015

(51) Int. Cl.
  *A45F 5/02* (2006.01)
  *F16B 2/20* (2006.01)
  *B25H 3/02* (2006.01)

(52) U.S. Cl.
  CPC ............ *F16B 2/20* (2013.01); *A45F 5/021* (2013.01); *B25H 3/02* (2013.01); *B25H 3/028* (2013.01)

(58) Field of Classification Search
  CPC .......... F16B 2/20; F16B 2/22; A45F 5/021; A45F 5/02; A45F 5/00; B25H 3/02; B25H 3/00; B25H 3/023; B25H 3/028; B25H 3/027; A47G 29/08
  USPC ................. 248/316.7, 316.1, 316.4
  See application file for complete search history.

(56) References Cited

U.S. PATENT DOCUMENTS

| | | | | |
|---|---|---|---|---|
| 1,005,985 A * | 10/1911 | Lebherz | ........... | A47K 1/09 132/308 |
| 1,053,523 A * | 2/1913 | McMillan | ........... | B65H 49/08 132/308 |
| 1,313,515 A * | 8/1919 | Caffrey | ........... | B44D 3/123 248/692 |
| 2,034,494 A * | 3/1936 | Stoll | ........... | F16B 39/24 411/147 |
| 3,275,187 A * | 9/1966 | Lamoureaux | ........... | B44D 3/123 15/105 |
| 3,536,285 A * | 10/1970 | Vaughn | ........... | B44D 3/123 211/65 |
| 3,891,175 A * | 6/1975 | Hawley | ........... | G08G 1/095 248/317 |
| 4,025,205 A * | 5/1977 | Hawk | ........... | B44D 3/126 15/230.11 |
| 4,283,038 A * | 8/1981 | Kurtz | ........... | A47G 1/215 248/316.4 |
| 4,364,143 A * | 12/1982 | Uhl | ........... | A46B 5/00 15/145 |
| 4,525,889 A * | 7/1985 | Dunau | ........... | A46B 17/02 15/143.1 |
| 4,572,717 A * | 2/1986 | Swick | ........... | F16B 31/028 411/11 |
| 4,835,812 A * | 6/1989 | Su | ........... | B05C 17/02 15/105 |
| 4,905,951 A * | 3/1990 | Putness | ........... | A47L 13/512 211/66 |
| 5,033,155 A * | 7/1991 | Klotz | ........... | A46B 7/00 15/144.4 |
| 5,398,365 A * | 3/1995 | MacKenzie | ........... | A46B 11/063 15/160 |

(Continued)

*Primary Examiner* — Nkeisha Smith
(74) *Attorney, Agent, or Firm* — Leong C. Lei (57) ABSTRACT

Provided is an improved structure of a back clip of a tool box. The tool box induces a main body and a back clip. The main body has a back side in which two slide channels are formed. The back side of the main body is also provided with a spring plate. The back clip has opposite side edges each forming a wing section. The two wing sections are receivable and engageable with the slide channels of the back side of the main body for sliding in a vertical direction. The back clip includes a hanging hole and a retention slot formed therein. With such a structural arrangement, a tool box that is carryable and usable in a hung or attached form is provided.

3 Claims, 7 Drawing Sheets

(56) References Cited

U.S. PATENT DOCUMENTS

| | | | | |
|---|---|---|---|---|
| 5,669,492 | A * | 9/1997 | Chao | B25G 1/085 |
| | | | | 206/234 |
| 6,871,825 | B2 * | 3/2005 | Song | B44D 3/123 |
| | | | | 248/110 |
| 8,236,006 | B2 * | 8/2012 | Hamada | A61B 17/7001 |
| | | | | 606/104 |
| 8,371,549 | B1 * | 2/2013 | Paquette | A47K 1/09 |
| | | | | 211/66 |
| 8,387,198 | B2 * | 3/2013 | Rodriguez | B25G 1/04 |
| | | | | 15/144.3 |
| 8,839,480 | B2 * | 9/2014 | Thomas | B25G 1/00 |
| | | | | 15/143.1 |
| 9,271,561 | B2 * | 3/2016 | Chang | A45F 5/021 |
| 9,351,561 | B2 * | 5/2016 | McCarthy | A46B 15/0095 |
| 2003/0180085 | A1 * | 9/2003 | Hughes | A01B 1/227 |
| | | | | 401/289 |
| 2004/0083579 | A1 * | 5/2004 | Furr-Britt | A47L 9/325 |
| | | | | 16/421 |
| 2005/0156085 | A1 * | 7/2005 | Radovan | A46B 17/02 |
| | | | | 248/110 |
| 2007/0158518 | A1 * | 7/2007 | Kurdoghlian | A47K 1/09 |
| | | | | 248/312 |
| 2008/0142648 | A1 * | 6/2008 | Rabi | A46B 5/0033 |
| | | | | 248/113 |
| 2009/0187194 | A1 * | 7/2009 | Hamada | A61B 17/7001 |
| | | | | 606/104 |
| 2012/0298135 | A1 * | 11/2012 | Luttrell | A46B 17/02 |
| | | | | 134/6 |
| 2015/0238027 | A1 * | 8/2015 | Yeh | A47K 10/04 |
| | | | | 248/307 |
| 2016/0227946 | A1 * | 8/2016 | Wawrzyniak | A47G 1/1606 |

* cited by examiner

STRUCTURE OF BACK CLIP OF TOOL BOX

(a) TECHNICAL FIELD OF THE INVENTION

The present invention relates generally to an improved structure of a back clip of a tool box, and more particularly to an improved design of a back clip of a tool box that allows the tool box to be carried and used in the formed of being hung or attached.

(b) DESCRIPTION OF THE PRIOR ART

Hand tools that are currently available have a large number of types and sizes, such as screwdriver bits. To improve convenience and easiness of storage and use, manufacturers often organizes and holds a number of hand tools in a tool box. Such a tool box is often of a structure including two casing members that mate each other and are pivotally jointed to allow the casing members to be lifted open and closed. Such a tool box may be provided with a buckle to lock the casing members when they are closed in order to prevent the hand tools placed in the tool box from dropping out.

For convenience and easiness of use and sale of the tool box, manufacturers often provides a back clip that is pivotally attached to, and thus rotatable with respect to, a back side of the tool box. Such a back clip can be fit to or hung on a waist belt of a user and the rotatability of the back clip allows for changing the direction of the tool box for easy use and operation.

However, the known back clip of the tool box provides a sole function of allowing a user to attach the tool box to the waist belt. The tool box provides no additional hanging means to allow the tool box to be hung or suspended for exhibition or sale. Tool boxes of this form can only be stacked or lined up one by one. A user is not allowed to stow tool boxes of this type in a hung or suspended form, and instead must have the tool boxes lined up and stacked one by one. This requires an additional amount of space for storage and may also readily lead to mix-up and undesired disorder of the tool boxes, making it not visually appealing.

SUMMARY OF THE INVENTION

An object of the present invention is to provide a back clip of a tool box that that allows the tool box to be carried and used in the formed of being hung or attached in order to overcome the drawbacks of the prior art tool boxes as discussed above.

To achieve the above object, the present invention provides a tool box, which comprises a main body and a back clip, wherein the main body comprises a box adapted to receive and hold therein hand tools, the main body having a back side that comprises two positioning pillars projecting outward therefrom, the two positioning pillars each having an inside surface in which a slide channel is formed, the back side of the main body comprising a hollowed opening formed therein, a spring plate being provided in and connected to the hollowed opening to extend in an inclined, the spring plate having a free distal end that forms a retaining engagement section; and the back clip comprises a thin plate, the back clip having two opposite lateral side edges each comprising a wing section formed thereon, the two wing sections being respectively and slidably receivable in the slide channels of the main body to allow the back clip to be movable, in a limited manner, in a vertical direction along the back side of the main body, the back clip comprising a hanging hole formed therein, the hanging hole having a width that is greater than a width of the spring plate of the back side of the main body, the back clip comprising a retention slot formed in a middle portion of an inside surface thereof, a projecting wall being arranged at a lower side of the retention slot, the back clip having a lower portion that comprises an insertion end.

The foregoing objectives and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

The technical solution that is adopted in the present invention to achieve the above object, and the structure thereof, will be described in detail with reference to FIGS. 1-7.

Figure 1:
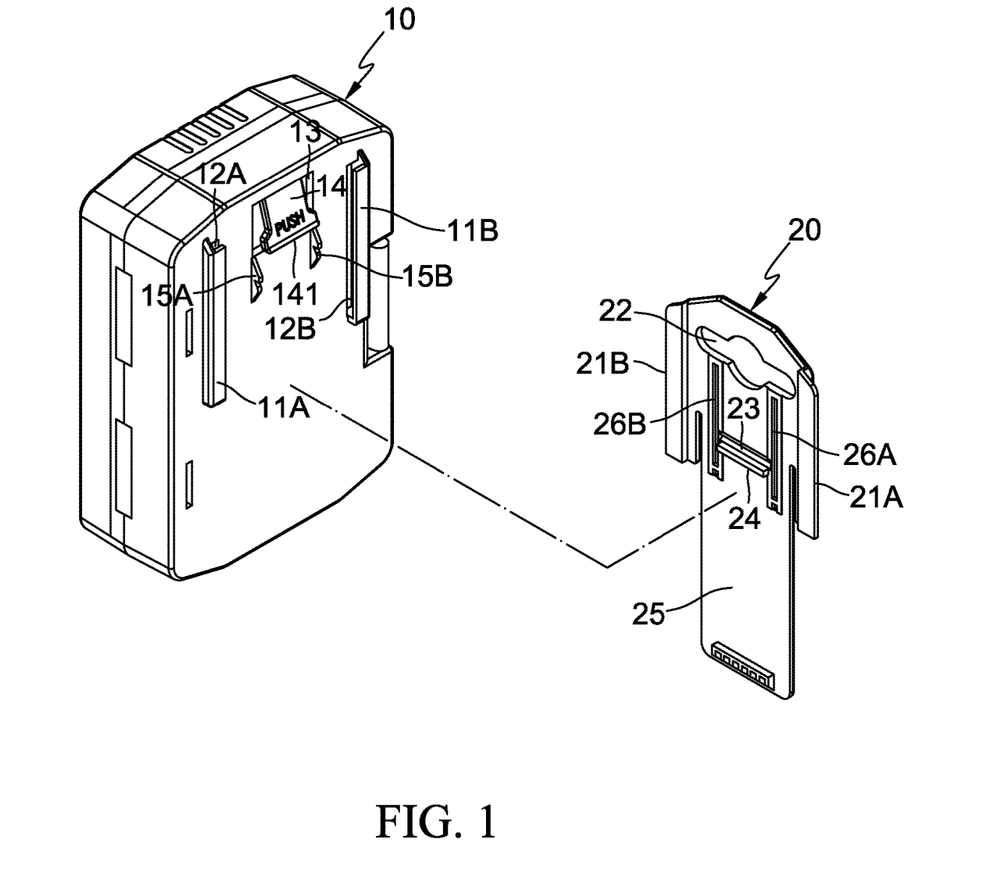
FIG. 1 is an exploded view of the present invention.
Figure 2:
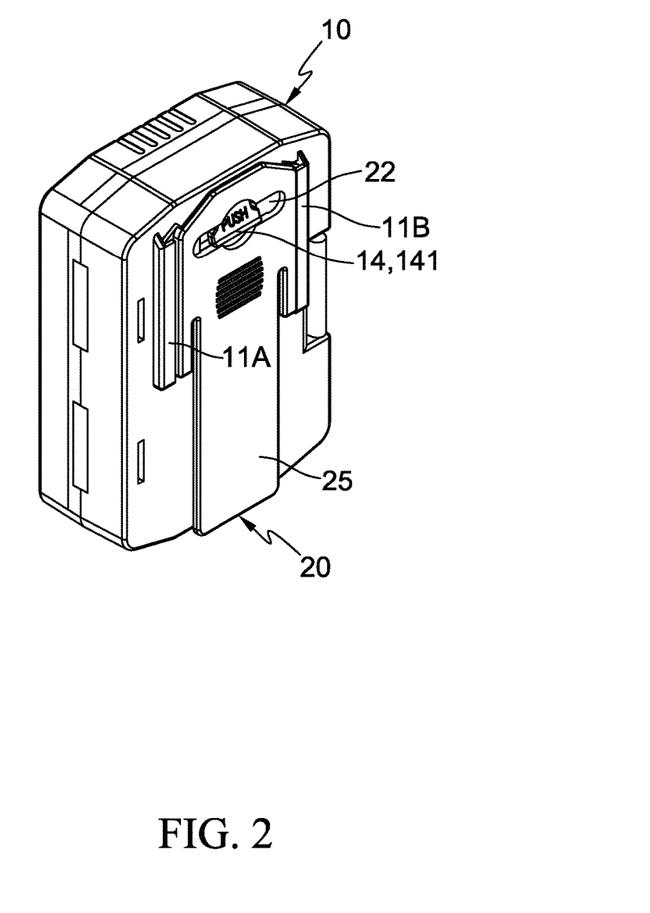
FIG. 2 is a perspective view of the present invention in an assembled form.

As shown in FIG. 1, an embodiment of the present invention provides a tool box, which comprises a main body 10 and a back clip 20.

The main body 10 (see FIGS. 2, 3, and 4) is a box that may receive and hold therein hand tools. The main body 10 has a back side that comprises two positioning pillars 11A, 11B projecting outward therefrom. The two positioning pillars 11A, 11B each have an inside surface in which a slide channel 12A, 12B is formed. The back side of the main body 10 also comprises a hollowed opening 13 formed in the back side wall. A spring plate 14 is provided in the hollowed opening 13 by extending from a peripheral side of the opening in a direction inclined with respect to the back side of the main body. The spring plate 14 has a free distal end that forms a retaining engagement section 141.

Figure 3:
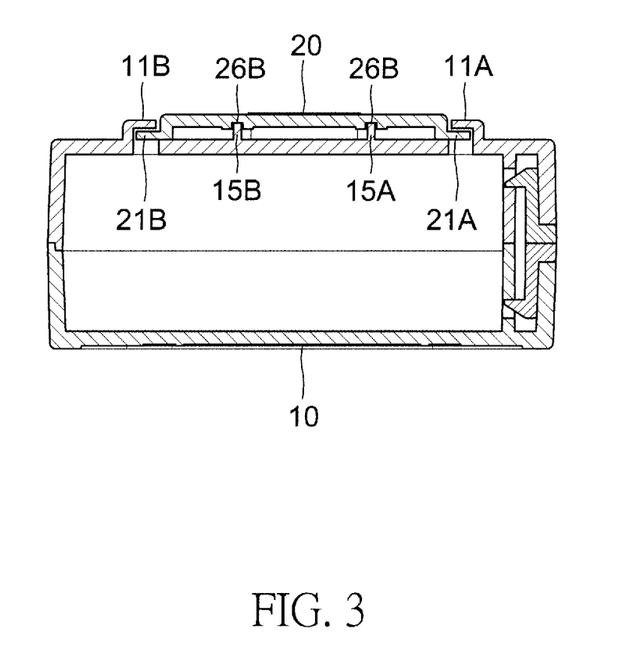
FIG. 3 is a cross-sectional view of the present invention in an assembled form.

Preferably, as shown in FIGS. 1 and 3, the back side of the main body 10 comprises two constraint blocks 15A, 15B formed thereon and projecting outward therefrom.

The back clip 20 (see FIGS. 2, 3, and 4) is a thin plate. The back clip 20 has two opposite lateral side edges each comprising a wing section 21A, 21B formed thereon. The two wing sections 21A, 21B are respectively and slidably received in the slide channels 12A, 12B of the main body 10 to allow the back clip 20 to be movable, in a limited manner, in a vertical direction (which is parallel to the positioning pillars) along the back side of the main body 10. The back clip 20 comprises a hanging hole 22 formed therein. The hanging hole 22 has a width (measured in a direction perpendicular to the vertical direction) that is greater than a width of the spring plate 14 of the back side of the main body 10. Further, the back clip 20 comprises a retention slot 23 formed in a middle portion of an inside surface thereof and a projecting wall 24 arranged at a lower side of the retention slot 23. Further, the back clip 20 has a lower portion that comprises an insertion end 25.

Preferably, as shown in FIGS. 1 and 3, the back clip 20 comprises two constraint grooves 26A, 26B formed therein in such a way that the two constraint grooves 26A, 26B respectively corresponding to and engageable with the two constraint blocks 15A, 15B of the main body 10.

Figure 4:
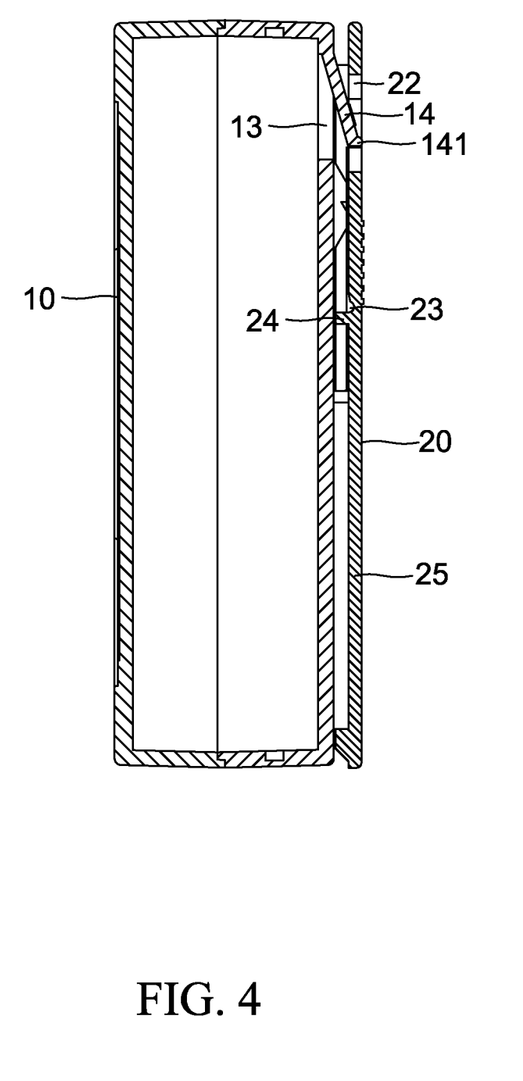
FIG. 4 is another cross-sectional view of the present invention in an assembled form.
Figure 5:
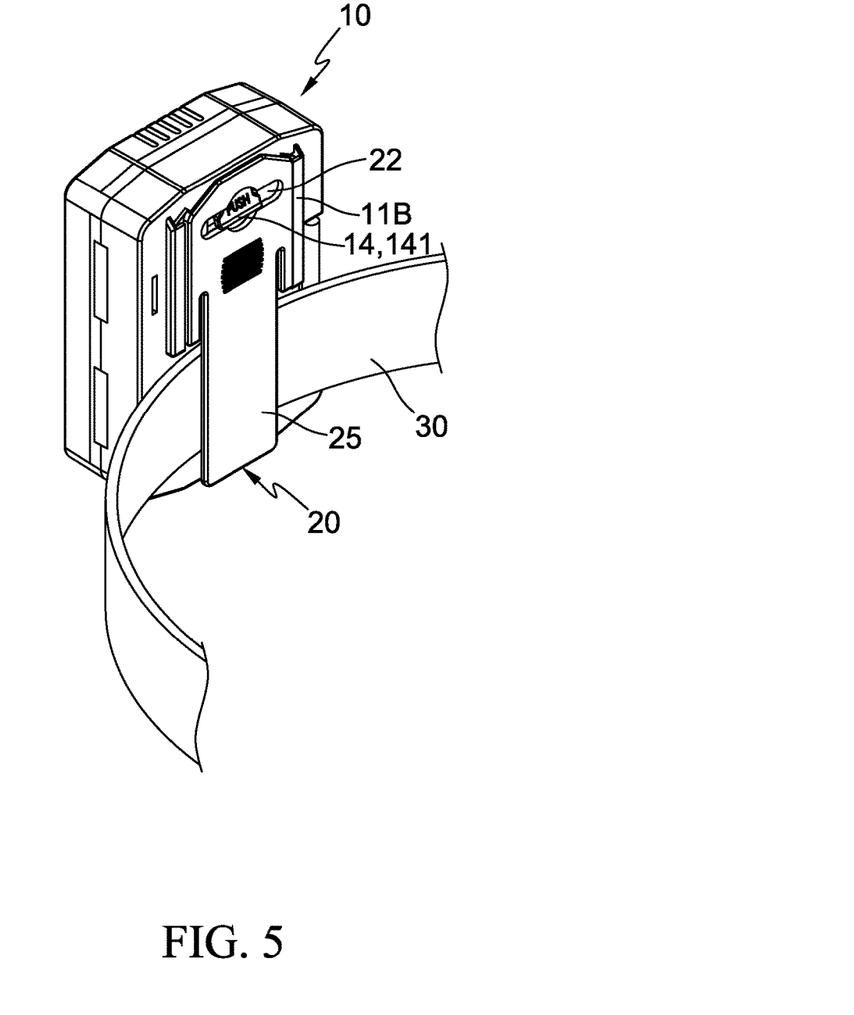
FIG. 5 is a perspective view illustrating the present invention in a condition where a back clip is at a lowest position and fit to and attached to a waist belt of a user.
Figure 6:
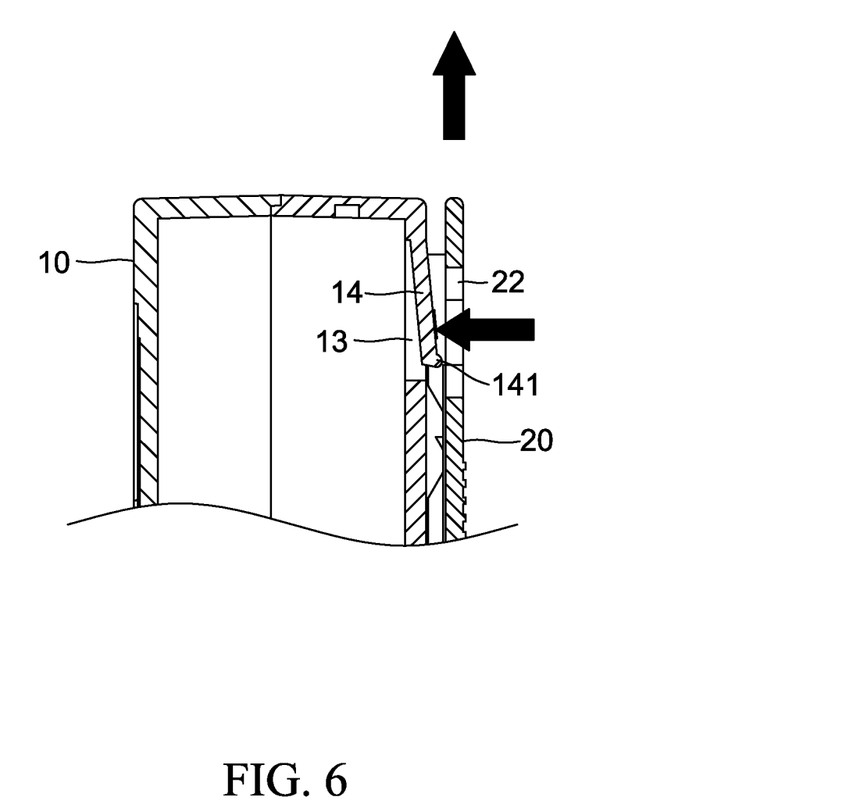
FIG. 6 is a cross-sectional view illustrating the present invention in a condition where a spring plate is pressed down and thus deflected toward a main body of the tool box.
Figure 7:
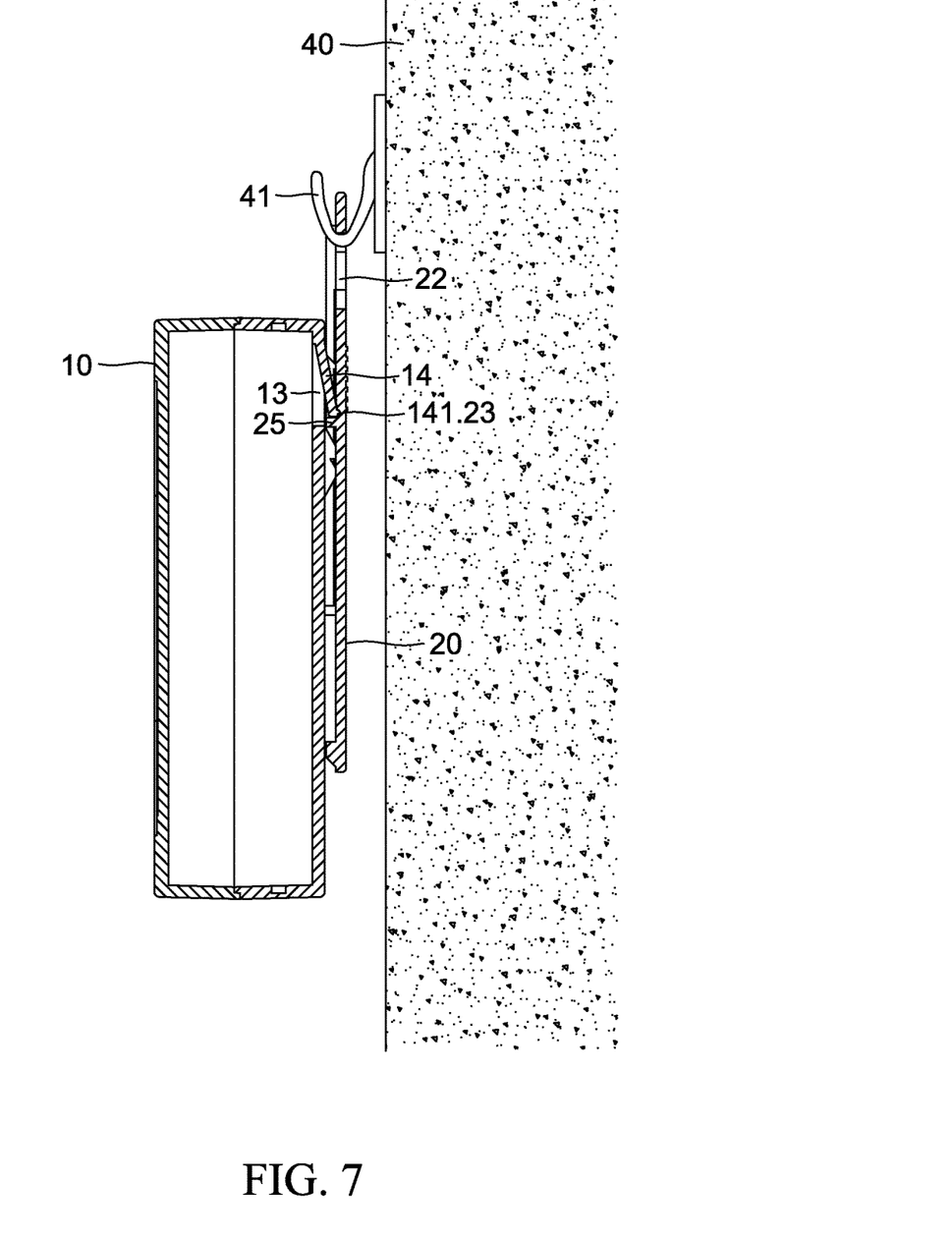
FIG. 7 is a cross-sectional view illustrating the present invention in a condition where the back clip is at a highest position and hung on a hanger.

With the above-described structural arrangement, as shown in FIG. 3, the wing sections 11A, 11B of the back clip 20 are receivable in the slide channels 12A, 12B of the main body 10 to have the back clip 20 coupled to the back side of the main body 10 and the constraint blocks 15A, 15B of the main body 10 are fit into and engage with the constraint grooves 26A, 26B of the back clip 20 so that the back clip 20 is slidable with respect to the back side of the main body 10 in the vertical direction. As shown in FIG. 4, when the back clip 20 is at a lowest position, the spring plate 14 of the main body 10 is exactly corresponding to the hanging hole 22 of the back clip 20 and the retaining engagement section 141 of the distal end of the spring plate 14 engages and thus retains against a lower side of the hanging hole 22, wherein the back clip 20 is constrained by the spring plate 14 and is not allowed to move upward even if an external force applied thereto and a top edge of the back clip 10 is substantially flush with a top of the main body 10. As such, the insertion end 25 of the lower portion of the back clip 20 is allowed to fit to and thus be attached to a belt (or waist belt) 30 of a user to have the main body 10 attached to and hung on the waist of the user (see FIG. 5), allowing for easy access and use of the hand tools received in the main body 10.

To hang and stow the tool box, the spring plate 14 is pressed down to deflect towards the main body 10 (see FIG. 6), so that the back clip 20 is released from the retaining engagement with the spring plate 14. The back clip 20 is then pulled upward, where the spring plate 14 is held in a condition of deflecting toward the main body 10 by the back clip 20 so as not to interfere with the sliding of the back clip 20. When the back clip 20 is pulled upwards to a highest position, the retention slot 23 of the back clip 20 is exactly corresponding to the retaining engagement section 141 of the distal end of the spring plate 14, whereby the retaining engagement section 141 is allowed to get received in and set in retaining engagement with the retention slot 23 of the back clip 20 (see FIG. 7). Further, due to constraint imposed by the projecting wall 24, the back clip 20 is securely fixed in position and is not allowed to move even if an external force is applied thereto. As a result of the above operation, the hanging hole 22 of the back clip 20 is moved outside and projects beyond the top of the main body 10 so that the tool box can be hung or suspended on a hanger 41 mounted to a fixture wall 40 (or a support brace) by means of the hanging hole 22.

In addition, to have the back clip 20 stowed and concealed behind the back side of the main body 10, the back clip 20 is moved downward to have the retention slot 23 of the back clip 20 disengage from the retaining engagement section 141 of the distal end of the spring plate 14 of the main body 10, where the spring plate 14 is held in pressed down condition by the back clip 20 and thus deflected toward the main body 10 so as not to interfere with the sliding of the back clip 20. When the back clip 20 is moved downward to the lowest position, the spring plate 14 of the main body 10 is exactly corresponding to the hanging hole 22 of the back clip 20 and the retaining engagement section 141 of the distal end of the spring plate 14 is allowed to re-engage and thus retain against the lower edge of the hanging hole 22, making the back clip 20 positioned and concealed behind the back side of the main body 10 and also being available for attachment to a belt 30.

From the above description, it would be readily understood that the present invention provides the following advantages:

(1) Since in the present invention, the back clip 20 is coupled to the back side of the main body 10 and is vertically movable up and down, when the back clip 20 is at the highest position, the hanging hole 22 of the back clip 20 is at a condition of projecting beyond and outside the main body 10 to allow for hanging on a hanger 41 mounted to a fixture wall 40 (or a support brace) so as to provide convenience of storage in a hung form.

(2) Since in the present invention, the back clip 20 is coupled to the back side of the main body 10 and is vertically movable up and down, when the back clip 20 is at the lowest position, the spring plate 14 is received in and in engagement with the retention slot 23 to prevent the back clip 20 from sliding downward so that the insertion end 25 of the back clip 20 can be fit to the belt 30 of a user to allow the tool box to be attached to and hung on the belt of the user for easy access and use.

(3) Further, when the back clip 20 is at the lowest position, the top edge of the back clip 20 is substantially flush with the top of the main body 10 so that the back clip 20 is entirely concealed behind the back side of the main body 10, providing convenience of being stackable for easy storage.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the claims of the present invention.

I claim:

1. A tool box, comprising a main body and a back clip, wherein:

the main body comprises a box adapted to receive and hold therein hand tools, the main body having a back side that comprises two positioning pillars projecting outward therefrom, the two positioning pillars each having an inside surface in which a slide channel is formed, the back side of the main body comprising a hollowed opening formed therein, a spring plate being provided in and connected to the hollowed opening to extend in an incline, the spring plate having a free distal end that forms a retaining engagement section; and the back clip comprises a thin plate, the back clip having two opposite lateral side edges each comprising a wing section formed thereon, the two wing sections being respectively and slidably receivable in the slide channels of the main body to allow the back clip to be movable, in a limited manner, in a vertical direction along the back side of the main body, the back clip comprising a hanging hole formed therein, the hanging hole having a width that is greater than a width of the spring plate of the back side of the main body, the back clip comprising a retention slot formed in a middle portion of an inside surface thereof, a projecting wall being arranged at a lower side of the retention slot, the back clip having a lower portion that comprises an insertion end;

wherein with above assembly, a tool box that is carryable and usable in a hung or attached form is provided.

2. The tool box according to claim 1, wherein the back side of the main body comprises two constraint blocks formed thereon and projecting outward therefrom.

3. The tool box according to claim 2, wherein the back clip comprises two constraint grooves formed therein, the two constraint grooves corresponding to and engageable with the two constraint blocks of the main body.

* * * * *